(12) United States Patent
Cress

(10) Patent No.: US 10,938,187 B1
(45) Date of Patent: Mar. 2, 2021

(54) PRECHAMBER SPARKPLUG HAVING ELECTRODES LOCATED FOR INHIBITING FLAME KERNEL QUENCHING

(71) Applicant: Caterpillar Inc., Peoria, IL (US)

(72) Inventor: James Jay Cress, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/870,487

(22) Filed: May 8, 2020

(51) Int. Cl.
*H01T 13/46* (2006.01)
*H01T 13/16* (2006.01)
*F02B 19/08* (2006.01)

(52) U.S. Cl.
CPC ............ *H01T 13/467* (2013.01); *F02B 19/08* (2013.01); *H01T 13/16* (2013.01); *H01T 13/46* (2013.01)

(58) Field of Classification Search
CPC .................. H01T 13/46–467; F02B 19/08
See application file for complete search history.

(56) References Cited

U.S. PATENT DOCUMENTS

| | | | |
|---|---|---|---|
| 5,105,780 A | 4/1992 | Richardson | |
| 5,554,908 A | 9/1996 | Kuhnert et al. | |
| 6,854,439 B2 | 2/2005 | Regueiro | |
| 8,324,792 B2 | 12/2012 | Maul et al. | |
| 8,536,769 B2 | 9/2013 | Kuhnert et al. | |
| 8,839,762 B1 | 9/2014 | Chiera et al. | |
| 9,476,347 B2 | 10/2016 | Chiera et al. | |
| 9,739,192 B2 | 8/2017 | Willi | |
| 9,745,892 B2 | 8/2017 | Sotiropoulou et al. | |
| 10,174,667 B1* | 1/2019 | Cress | F02B 19/12 |
| 2011/0148274 A1* | 6/2011 | Ernst | H01T 13/467 313/141 |
| 2013/0099653 A1* | 4/2013 | Ernst | H01T 13/54 313/140 |
| 2015/0020766 A1 | 1/2015 | LaPointe et al. | |
| 2017/0145898 A1* | 5/2017 | Schafer | H01T 13/467 |
| 2017/0167357 A1 | 6/2017 | Maier et al. | |
| 2017/0358906 A1* | 12/2017 | Kuhnert | H01T 13/32 |
| 2019/0376441 A1* | 12/2019 | Brubaker | F02B 43/04 |

FOREIGN PATENT DOCUMENTS

| | | | | |
|---|---|---|---|---|
| DE | 102014015707 A1 * | 12/2015 | ............ | F02B 19/12 |
| DE | 102015204814 B3 * | 5/2016 | ............ | F02B 19/12 |
| EP | 971107 A2 | 1/2000 | | |
| EP | 3173596 A1 * | 5/2017 | ............ | H01T 13/32 |
| WO | 2014177169 A1 | 11/2014 | | |
| WO | 2016075358 A1 | 5/2016 | | |
| WO | 2017003460 A1 | 1/2017 | | |
| WO | 2017093598 A1 | 6/2017 | | |

* cited by examiner

*Primary Examiner* — Mariceli Santiago
(74) *Attorney, Agent, or Firm* — Brannon Sowers & Cracraft

(57) ABSTRACT

A prechamber sparkplug includes a housing having a nozzle with a prechamber formed therein, and each of a first set and a second set of electrode prongs within the prechamber. The second set of electrode prongs downwardly depend from attachment points to the housing, and form, together with the first set of electrode prongs, spark gaps within the prechamber. Each of the anode-cathode pairs formed by the sets of electrode prongs is spaced radially inward a clearance distance from the prechamber wall to position the spark gaps in a flow of swirled gases. The flow of swirled gases displaces a flame kernel formed at the spark gaps to inhibit quenching.

15 Claims, 4 Drawing Sheets

US 10,938,187 B1

PRECHAMBER SPARKPLUG HAVING ELECTRODES LOCATED FOR INHIBITING FLAME KERNEL QUENCHING

TECHNICAL FIELD

The present disclosure relates generally to a prechamber sparkplug, and more particularly to a prechamber sparkplug having electrodes located for inhibiting flame kernel quenching.

BACKGROUND

Internal combustion engines, including gasoline or natural gas spark-ignited engines, diesel compression ignition engines, dual fuel engines, and still others, generally operate by producing a controlled combustion reaction within a cylinder to drive a piston coupled with a rotatable crankshaft. Concerns as to emissions, as well as price and supply considerations, has led in recent years to increased interest in exploiting gaseous fuels such as natural gas. Certain gaseous fuels, including not only natural gas but also ethane, methane, landfill gas, biogas, mine gas, and various others can be combusted to produce relatively low levels of certain emissions and are often readily available even at remote locations. Advantages of gaseous fuel engines with respect to emissions tend to be most significant where the fuels are combusted in the engine at a stoichiometrically lean ratio of fuel to air, having an equivalence ratio less than 1. Conventional spark-ignition strategies can sometimes fail to reliably ignite lean mixtures, potentially leading to misfire or combustion stability problems. Employing a prechamber sparkplug can address some of these concerns by igniting a small, relatively confined charge of a lean fuel and air mixture in a prechamber using a spark, to produce a jet of hot combustion gases delivered to a main combustion chamber, resulting in a hotter, more uniform, and typically more robust combustion reaction as compared to other techniques such as traditional sparkplugs.

Stoichiometrically lean fuel mixtures may still fail to ignite in a prechamber, or even if some initial flame kernel can be produced the turbulent gas flow within the prechamber can extinguish the nascent flame. One strategy directed at preventing quenching of a newly formed flame kernel is set forth in U.S. Pat. No. 8,839,762 to Chiera et al. In Chiera, a multi-chamber igniter is structured to prevent quenching by enabling pushing a newly formed flame kernel to a separate chamber, and thereby isolating the flame kernel from gases in the prechamber. While Chiera et al. and other strategies may have certain applications, there is always room for improvement and alternative strategies in this field.

SUMMARY OF THE INVENTION

In one aspect, a prechamber sparkplug includes a housing having a nozzle with an outer surface, and an inner surface forming a prechamber having a prechamber wall extending circumferentially around a nozzle axis. The nozzle axis extends between an upper nozzle end, and a lower nozzle end forming at least one gas port extending from the inner surface to the outer surface and oriented at a swirl angle relative to the nozzle axis. The prechamber sparkplug further includes a first set of electrode prongs within the prechamber, and a second set of electrode prongs within the prechamber and downwardly depending from the housing, such that the second set of electrode prongs form, together with the first set of electrode prongs, anode-cathode pairs defining spark gaps within the prechamber. Each of the anode-cathode pairs is spaced radially inward a clearance distance from the prechamber wall to position the spark gaps in a flow of swirled gases from the at least one gas port.

In another aspect, a nozzle subassembly for a prechamber sparkplug includes a nozzle body having an outer surface, and an inner surface forming a prechamber having a prechamber wall extending circumferentially around a nozzle axis. The nozzle axis extends between an upper nozzle end, and a lower nozzle end forming at least one gas port extending from the inner surface to the outer surface and oriented at a swirl angle relative to the nozzle axis. The nozzle subassembly further includes a first set of electrode prongs including electrode tips within the prechamber, and a second set of electrode prongs each extending, in a path parallel to the nozzle axis, from a base end attached to the nozzle body to an electrode tip within the prechamber. The second set of electrode prongs are aligned with the first set of electrode prongs to form anode-cathode pairs defining spark gaps. Each of the anode-cathode pairs is spaced radially inward from the prechamber wall, such that a clearance extends between each anode-cathode pair and the prechamber wall and the spark gaps are positioned for impingement by a flow of swirled gases from the at least one gas port.

In still another aspect, a method of igniting a combustion charge in an engine includes conveying gases containing fuel and air through a port oriented at a swirl angle in a nozzle of a prechamber sparkplug such that a swirled flow of the gases is produced within a prechamber of the prechamber sparkplug. The method further includes producing a flame kernel at a spark gap of an anode-cathode pair having a spark gap location that is spaced a clearance distance radially inward of a prechamber wall. The method further includes displacing the flame kernel with the swirled flow of gases such that quenching of the flame kernel is inhibited, igniting the fuel and air within the prechamber by way of the displaced flame kernel, and discharging combustion gases produced from the ignition of the fuel and air from the port for igniting a main combustion charge in an engine.

DETAILED DESCRIPTION

Figure 1:
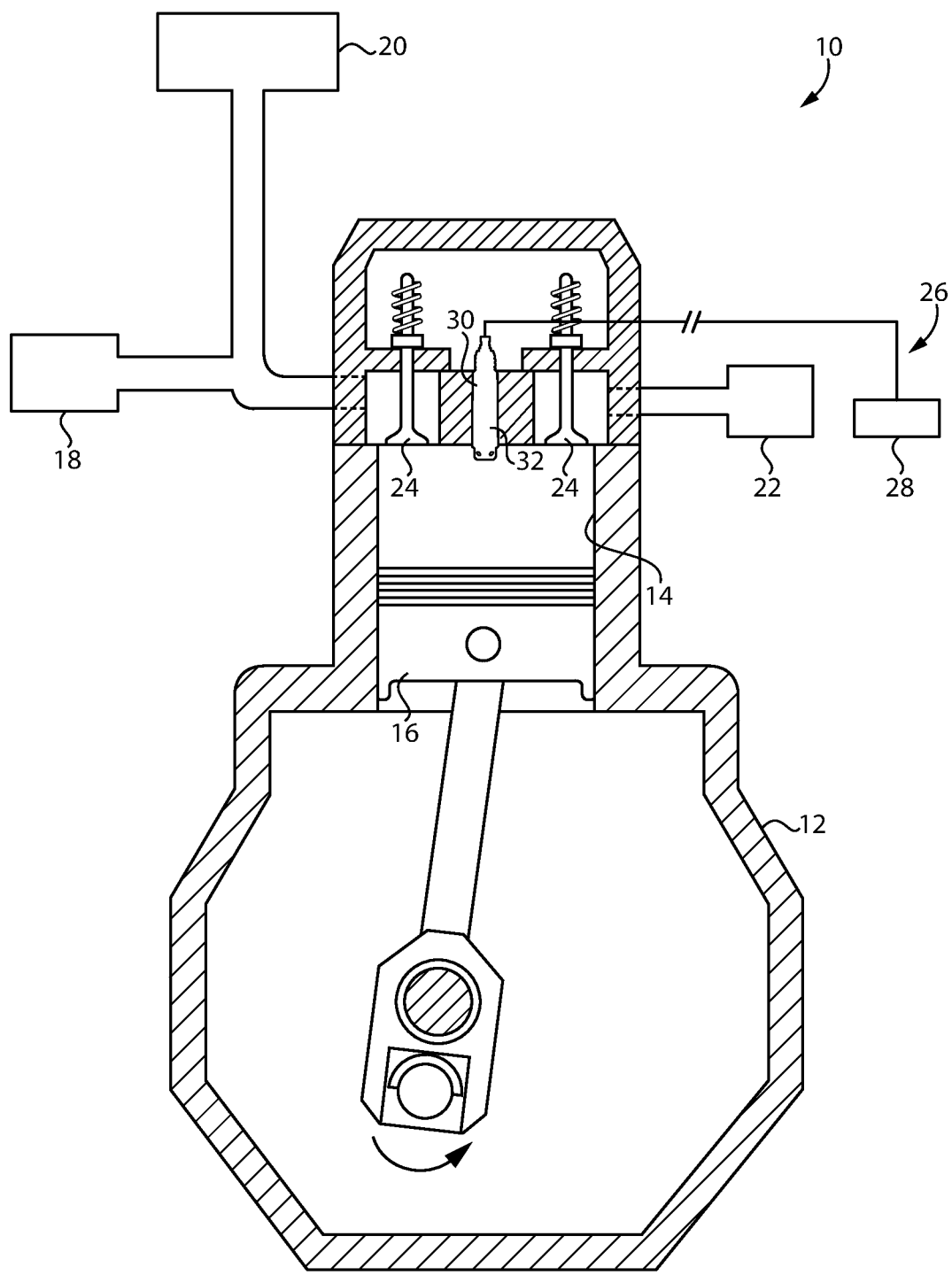
FIG. 1 is a partially sectioned diagrammatic view of an internal combustion engine system, according to one embodiment.

Referring to FIG. 1, there is shown an internal combustion engine system 10 according to one embodiment. Internal combustion engine system 10 includes an engine housing 12 having a cylinder 14 formed therein, and a piston 16 movable within cylinder 14 between a top dead center position and a bottom dead center position in a generally conventional manner. Internal combustion engine system 10 (hereinafter "engine system 10") also includes gas exchange valves 24 operable to open and close fluid connections between cylinder 14 and gas exchange conduits formed in engine housing 12. Engine housing 12 may have any number of combustion cylinders formed therein, and in any suitable arrangement such as a V-pattern, an in-line pattern, or still another. Engine system 10 may be spark-ignited and structured to operate in a conventional four-cycle pattern upon a mixture of air and a gaseous fuel such as natural gas, methane, ethane, mine gas, landfill gas, biogas, blends of these, or still others. Engine system 10 could also operate upon a mixture of air and premixed gasoline, a mixture of gaseous fuel and a directly injected liquid fuel, or other combinations and configurations.

Engine system 10 includes an air inlet 18 structured to receive and supply a flow of air to cylinder 14, and a fuel supply 20 which may include a gaseous fuel supply structured to provide a flow of fuel to an incoming flow of air for combustion. Additional equipment in the nature of a compressor, filters, fuel admission valves, vaporization and pressurization equipment for gaseous fuel stored in a liquid state, and still other apparatus may be provided in engine system 10 for supplying and conditioning air and fuel for combustion. The present disclosure is not limited in regards to the location and manner of supplying fuel to cylinder 14. Exhaust produced by combustion of air and fuel in cylinder 14 can be conveyed to an exhaust system 22 for treatment and discharge in a generally conventional manner. Engine system 10 further includes an ignition system 26 having an electrical energy source 28 such as an ignition coil coupled with a prechamber sparkplug 30.

Ignition system 26 could include other electrical apparatus for producing and/or controlling energizing of prechamber sparkplug 30, including an electronic control unit or ECU. Prechamber sparkplug 30 includes a housing 32 and is mounted within engine housing 12 so as to produce hot jets of combustion gases that are advanced into cylinder 14 to ignite a main charge of fuel and air in cylinder 14 in a generally known manner. In the illustrated embodiment, piston 16 can be advanced in engine housing 12 toward a top dead center position to push a mixture of fuel and air into prechamber sparkplug 30, such that all of the fuel and air in an ignition charge combusted in prechamber sparkplug 30 is thusly conveyed into prechamber sparkplug 30. Engine system 10, at least at times, may operate on a stoichiometrically lean charge of fuel and air, including an excess amount of air to an amount of fuel, however, the present disclosure is not thereby limited. As discussed above, ignition problems such as misfire can be observed in certain engine systems, notably engine systems operating on stoichiometrically lean mixtures of fuel and air. As will be further apparent from the following description, ignition system 26, and including prechamber sparkplug 30, may be uniquely configured for improved reliability in initiation of combustion of an ignition charge of fuel and air.

Figure 2:
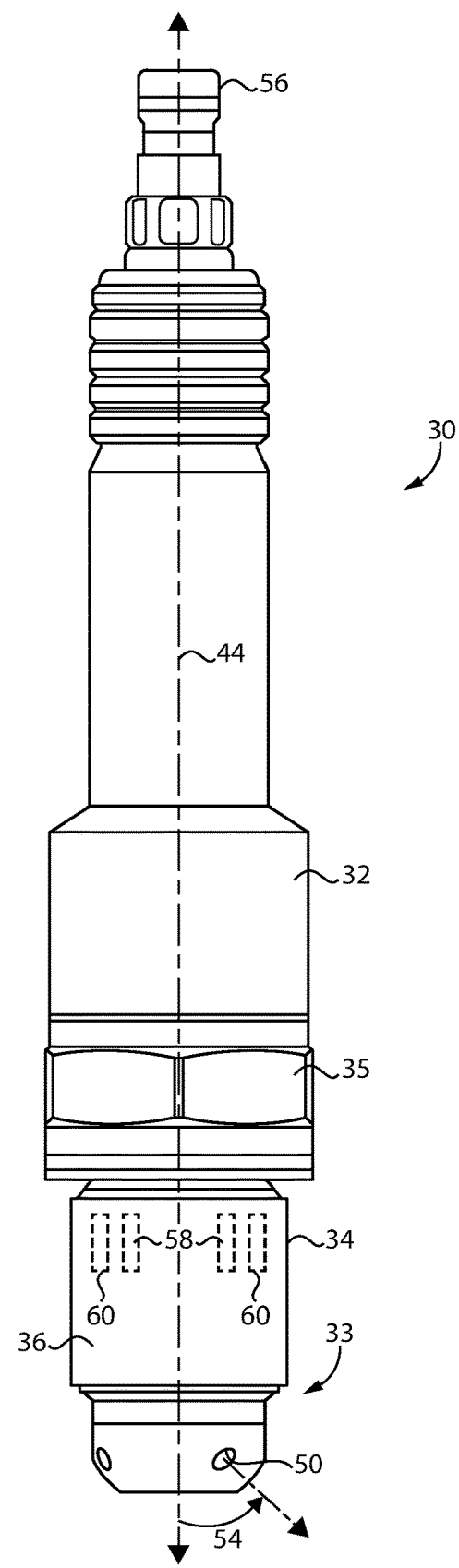
FIG. 2 is a diagrammatic view of a prechamber sparkplug, according to one embodiment.

Referring also now to FIG. 2, there are shown additional features of prechamber sparkplug 30. Housing 32 may include a nozzle 34 having an outer surface 36, and an inner surface discussed hereinafter, and a longitudinal nozzle axis 44. An electrical connector 56, for connecting to electrical energy source 28 is located at one end of prechamber sparkplug 30, opposite to at least one gas port 50 that fluidly connect an internal prechamber in prechamber sparkplug 30 to cylinder 14. The at least one gas port 50, hereinafter referred to at times in the singular, is oriented at a swirl angle 54 relative to nozzle axis 44. It should be appreciated that a swirl angle as contemplated herein means an angle defined by an orientation of gas port 50 that causes incoming gases into prechamber sparkplug 30 to travel in a circumferential swirling pattern about nozzle axis 44. Gas port 50 may be oriented so as to have both an axially advancing component, up and down in the FIG. 2 illustration, and a radial component, left to right or in and out of the page in FIG. 2, relative to nozzle axis 44. Gas port 50 might be located on a chord of a circle centered on nozzle axis 44, in an axial projection plane. A gas port located on a radius of a circle centered on nozzle axis 44 is not likely fairly considered oriented at a swirl angle. A gas port itself centered upon nozzle axis 44, or parallel to nozzle axis 44, is also not likely oriented at a swirl angle. Those skilled in the art will appreciate various orientations, including linear orientations, curvilinear orientations, and other geometric attributes of gas port 50 that can be employed in conjunction with the geometry of prechamber sparkplug 30 to induce a swirling flow of gases that are pushed through gas port 50 into prechamber sparkplug 30 in response to upward motion of piston 16 in cylinder 14.

Figure 3:
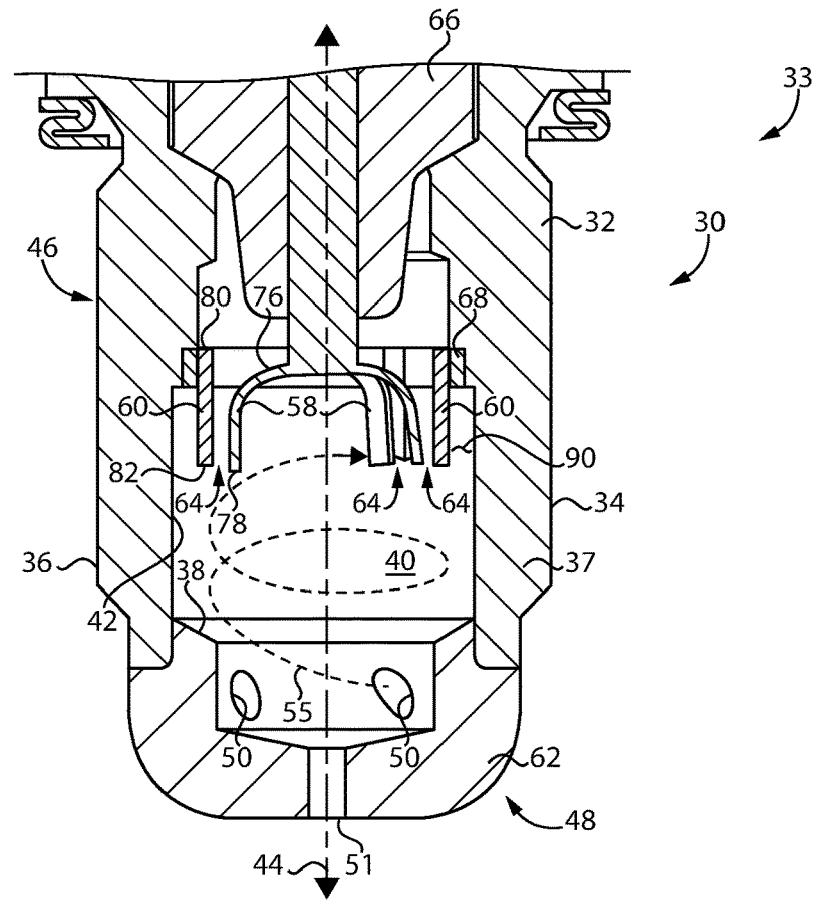
FIG. 3 is a sectioned side diagrammatic view of a nozzle subassembly for a prechamber sparkplug, according to one embodiment.

Referring also now to FIG. 3, there are shown additional features of prechamber sparkplug 30 in a sectioned view. Housing 32 includes nozzle 34 as discussed above. Nozzle 34 may be part of a nozzle subassembly 33 having additional components as further discussed herein. Prechamber sparkplug 30 may be installed in engine housing 12 in any suitable manner, and will typically be installed by a threaded engagement to engage threads on prechamber sparkplug 30 with threads in engine housing 12, such as by engaging a tool with a hex 35 as shown in FIG. 2 and rotating housing 32 relative to engine housing 12. When installed, most or all of nozzle subassembly 33 will typically be positioned within cylinder 14. As also noted above, nozzle 34 includes an outer surface 36, and an inner surface 38 forming a prechamber 40 having a prechamber wall 42 extending circumferentially around nozzle axis 44. Nozzle axis 44 extends between an upper nozzle end 46, and a lower nozzle end 48 forming the at least one gas port 50. The at least one gas port 50, and in the illustrated embodiment a plurality of gas ports 50, may be spaced circumferentially around nozzle axis 44, and formed in a tip piece 62 of nozzle 34 in the illustrated embodiment. Gas port 50 extends from inner surface 38 to outer surface 36 and is oriented at swirl angle 54 relative to nozzle axis 44, as illustrated in FIG. 2. A swirl path is shown by way of example at numeral 55 in FIG. 3, and it can be noted that gases conveyed into prechamber 40 by way of gas port 50 can circulate generally helically around nozzle axis 44 from lower nozzle end 48 toward upper nozzle end 46, the significance of which will be further apparent from the following description. An axially extending gas port 51 is also shown in FIG. 3, formed in tip piece 62.

Figure 4:
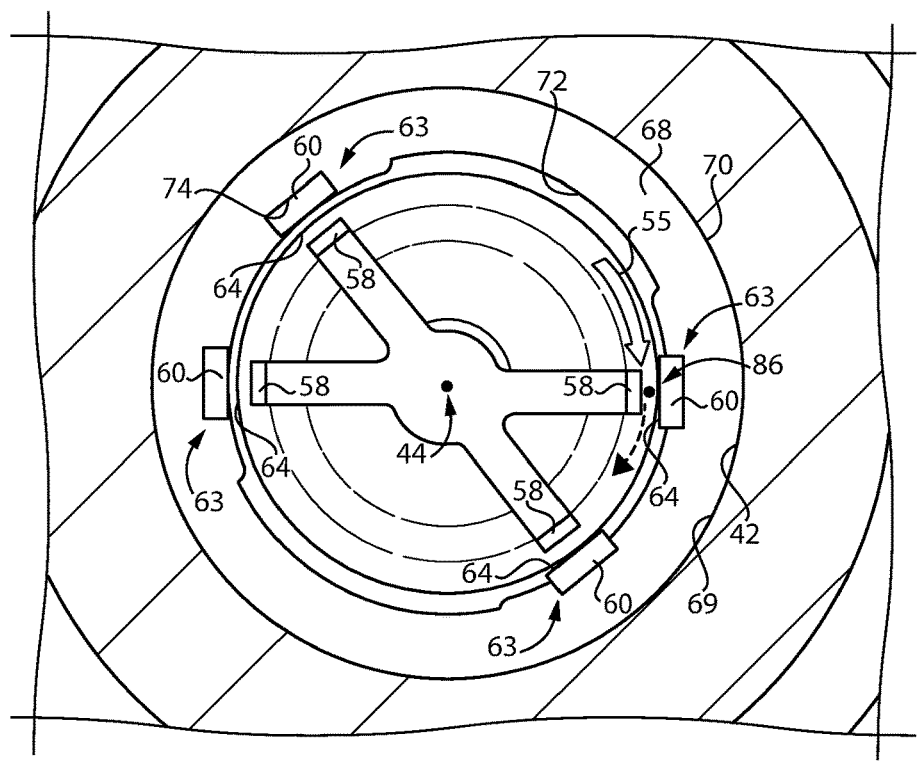
FIG. 4 is an axial section view of a portion of a prechamber sparkplug, according to one embodiment.

Prechamber sparkplug 30, and nozzle subassembly 33, further includes a first set of electrode prongs 58 within prechamber 40, and a second set of electrode prongs 60 within prechamber 40. Second set of electrode prongs 60 downwardly depend from attachment points with housing 32. Second set of electrode prongs 60 may further be understood each to extend in an axially advancing path parallel to nozzle axis 44. Referring also to FIG. 4, second set of electrode prongs 60 form, together with first set of electrode prongs 58, anode-cathode pairs 63 defining spark gaps 64 within prechamber 40. In the illustrated embodiment a total of four anode-cathode pairs 63 are shown although in other instances more than four pairs, or a total of one, might be used. The paths along which second set of electrode prongs 60 extend may further be understood as parallel to nozzle axis 44 from a base end 80 attached to housing 32, including for example a nozzle body 37, to an electrode tip 82 positioned within prechamber 40. Nozzle body 37 forms a part of housing 32. First set of electrode prongs 58 may each be understood to extend from a base end 76 to an electrode tip 78 within prechamber 40.

Second set of electrode prongs 60 are aligned with first set of electrode prongs 58 to form anode-cathode pairs 63. Each of anode-cathode pairs 63 is spaced radially inwards, a clearance distance from prechamber wall 42, such that a clearance 90 extends radially between each anode-cathode pair 63 and prechamber wall 42. Clearance 90 may be fully circumferential of all of anode-cathode pairs 63 such that an unobstructed flow path for swirled gases extends axially along prechamber wall 42, and circumferentially around prechamber 40. This arrangement positions spark gaps 64 in a flow of swirled gases from port 50, including for direct impingement by the flow of swirled gases from port 50. As further discussed herein, this positioning of spark gaps 64 can assist in displacing of a flame kernel such that quenching of the flame kernel is inhibited, and ignition reliability and robustness improved.

As can also be seen from the Figures, each of spark gaps 64 extends radially between electrode prongs 58 and 60 forming the respective anode-cathode pair 63. First set of electrode prongs 58 may be positioned radially inward of second set of electrode prongs 60 and electrically connected to electrical terminal 56. Also in the illustrated embodiment, first set of electrode prongs 58 are supported in an insulator 66 coupled to housing 32. Those skilled in the art will recognize first set of electrode prongs 58 as being similar to certain known electrode prong configurations, extending in a curvilinear path from the respective base end 76 to the respective electrode tip 78. Each of second set of electrode prongs 60 may extend in a linear path from the respective base end 80 to respective electrode tip 82. It will thus be appreciated that the curvilinear paths of first set of electrode prongs 58 enables first set of electrode prongs 58 to each approach one of second set of electrode prongs 60 to form spark gaps 64 generally at locations of closest approach. Within each anode-cathode pair 63 electrode prongs 58 may be the cathode, and electrode prongs 60 the anode, although a reversed polarity could in certain instances be employed. Electrode prongs 58 are thus electrically connected to electrical terminal 56, and electrode prongs 60 are electrically connected to housing 32.

Further alternatives could employ different shapes or paths for the respective electrode sets 58 and 60. For example, embodiments are contemplated where electrodes 60 have curved paths and electrodes 58 have linear paths. It will also be appreciated that, while each anode-cathode pair 63 will typically be structured such that electrode tips 78 and 82 are in circumferential alignment and spark gaps 64 extend between them according to only a radial aspect, in some instances a degree of circumferential offset could be employed such that spark gaps 64 have both a radial aspect and a circumferential aspect. In still other instances, spark gaps 64 might have only a circumferential aspect, and no radial aspect. In any event, spark gaps 64 are positioned in prechamber 40 such that the swirled flow of gases therein can assist in displacing a flame kernel away from the spark gap and also away from surfaces that can cause quenching as further discussed herein.

Figure 5:
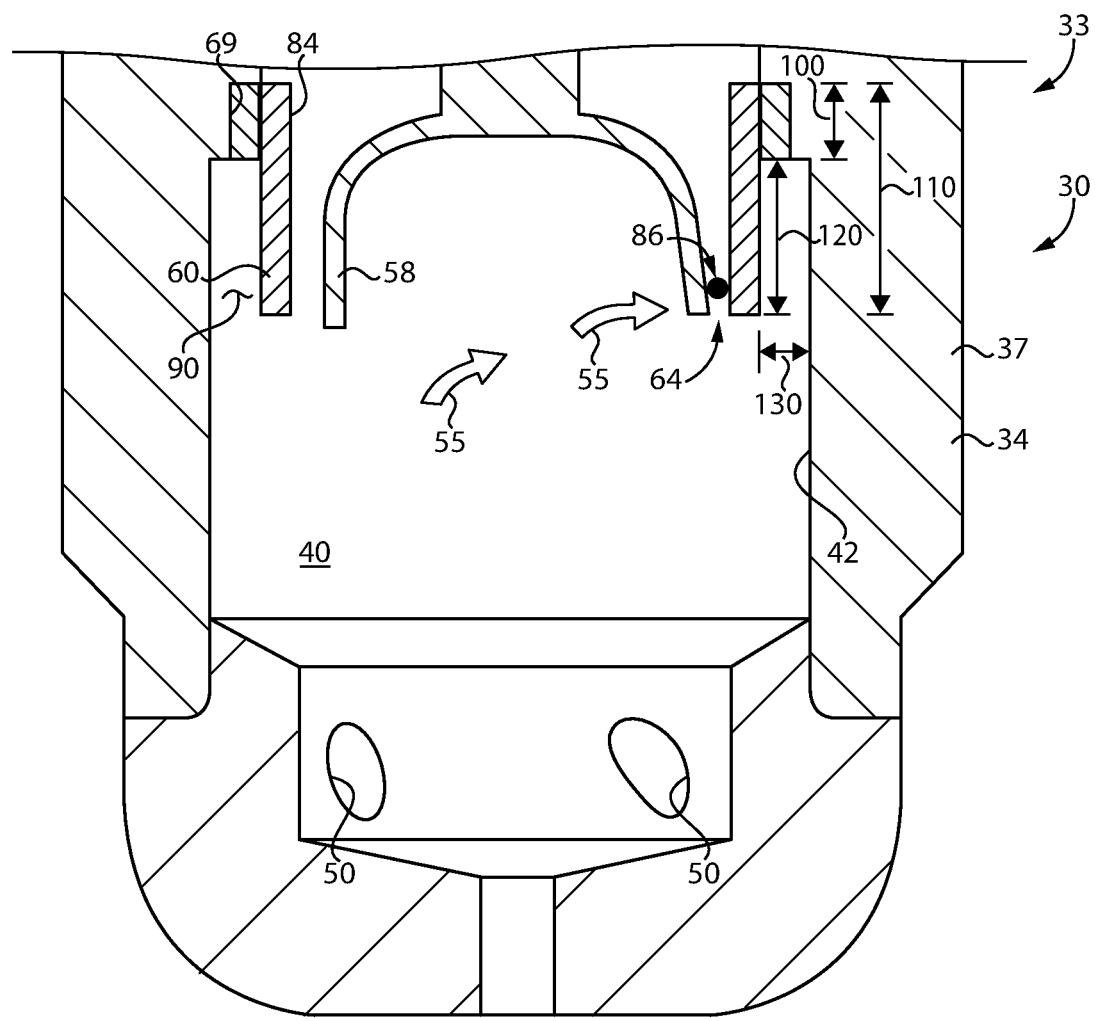
FIG. 5 is a sectioned side diagrammatic view of a nozzle subassembly for a prechamber sparkplug, according to one embodiment.

Referring also now to FIG. 5, housing 32 may further include an insert 68 positioned within a bore 69 in housing 32, and attached such as by welding. Insert 68 is thus part of nozzle body 37. Insert 68, which may be annular, extends circumferentially around nozzle axis 44 and forms an electrode opening 84 for first set of electrode prongs 58. Second set of electrode prongs 60 may be supported in insert 68 and electrically connected to insert 68, in turn electrically connecting electrode prongs 60 to housing 32. Each of electrode prongs 60 may be positioned within a slot 74 formed in an inner diameter surface 72 of insert 68. An outer diameter surface 70 of insert 68 may contact housing 32 within bore 69. Insert 68 and electrode prongs 60 could all be formed as one piece in certain embodiments. Moreover, electrode prongs 60, insert 68, and nozzle body 37 could all be formed as a single uniform piece, although forming insert 68 of an insert material, and second set of electrodes 60 of an electrode material different from the insert material provides a practical implementation strategy. The insert material could be steel or another iron-based alloy, and the electrode material could be nickel, iridium, platinum, or another suitable electrode material. Nozzle body 37 could be formed of a nozzle body material, the same as or different from the insert material, with electrodes 58 and electrodes 60 being formed of an electrode material different from the nozzle body material. Electrodes 58 and electrodes 60 are both consumable and will tend to erode during service, typically and desirably at approximately the same rates.

Also shown in FIG. 5 are certain geometric and proportional attributes of nozzle subassembly 33. As shown in FIG. 5, each one of second set of electrodes 60 has an exposed electrode length 120, within prechamber 40. Exposed electrode length 120 is greater than a size 130 of clearance 90 in at least some embodiments. Insert 68 may further have an insert axial thickness 100. Insert axial thickness may be equal to a heat transference length 100 that each of second set of electrodes 58 has with insert 68, and thus with housing 32. An electrode full axial length is shown at 110 and may be from two times to four times heat transference length 100. Put differently, a length of contact between each of electrodes 60 and housing 32, in the illustrated case insert 68, may be from about 25% to about 50% of a full axial length of each of second set of electrodes 60. A length of electrode exposed within housing 32 can affect a temperature of the electrode that will tend to be observed during service. Temperatures that are too low can impact the lean capability of a prechamber sparkplug, whereas temperatures too high can create other problems. According to the present disclosure, a length of electrode that is exposed to hot gases within prechamber 40, relative to a length of electrode that is attached to and in heat transference contact with housing 32, can affect a temperature of the subject electrode that will tend to be observed during service. By making the electrode length exposed to hot combustion gases relatively larger as compared to the heat transference length with the housing, a temperature of the electrode may be relatively higher. Where the exposed electrode length as compared to the heat transference length is relatively less, the temperature of the electrode that can be expected to be observed may be relatively lower. It has been determined that the described range provides practical boundaries for tuning electrode temperature based upon engine operating and combustion conditions that are expected to be experienced during service.

INDUSTRIAL APPLICABILITY

Referring to the drawings generally, as discussed above piston 16 is reciprocated within engine housing 12 typically in a four-cycle pattern to compress fuel and air, expand in response to combustion of fuel and air, reciprocate back upward to expel exhaust gases, and then return downward to draw in a fresh charge of fuel and air for another cycle.

During a compression stroke of piston 16, gases containing fuel and air will be conveyed through port 50, oriented at swirl angle 54, such that a swirled flow of gases is produced within prechamber 40. At an appropriate timing, ignition system 26 may be energized or operated to energize electrodes 58, producing an electrical spark at one of spark gaps 64, that produces a flame kernel 86. Flame kernel 86, produced at a spark gap 64 of typically one of anode-cathode pairs 63 at any one time, will be spaced a clearance distance radially inward of prechamber wall 42.

As the swirled flow of gases advances around prechamber 40 the nascent flame kernel 86 will tend to be displaced from the one of spark gaps 64, and carried along in the swirled flow of gases. Each of FIGS. 4 and 5 depicts flame kernel 86 as it might appear about to be displaced by the swirled flow of gases. Displacing spark kernel 86 rapidly and carrying flame kernel 86 along with the swirled fuel and air, away from prechamber wall 42 and other structures, is believed to prevent quenching of flame kernel 86 by avoiding structures and materials that have a cooling effect, and assist in achieving improved ignition robustness and combustion stability in prechamber 40. The combustion initiated within prechamber 40 will then create a rapid pressure and temperature rise that produces jets of hot gases containing combustion products and potentially actively combusting gases from port 50 into cylinder 14 to initiate combustion of the main charge of fuel and air therein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A prechamber sparkplug comprising:
   a housing including a nozzle having an outer surface, and an inner surface forming a prechamber having a prechamber wall extending circumferentially around a nozzle axis;
   the nozzle axis extending between an upper nozzle end, and a lower nozzle end forming at least one gas port extending from the inner surface to the outer surface and oriented at a swirl angle relative to the nozzle axis;
   a first set of electrode prongs within the prechamber;
   a second set of electrode prongs within the prechamber and downwardly depending from the housing, such that the second set of electrode prongs form, together with the first set of electrode prongs, anode-cathode pairs defining spark gaps within the prechamber; and
   each of the anode-cathode pairs is spaced radially inward a clearance distance from the prechamber wall to position the spark gaps in a flow of swirled gases from the at least one gas port.

2. The prechamber sparkplug of claim 1 wherein each of the spark gaps extends radially between the electrode prongs forming the respective anode-cathode pair.

3. The prechamber sparkplug of claim 2 further comprising an electrical terminal, and wherein the first set of electrode prongs are radially inward of the second set of electrode prongs and electrically connected to the electrical terminal.

4. The prechamber sparkplug of claim 3 wherein the first set of electrode prongs are supported in an insulator coupled to the housing, and wherein the housing includes an insert and the second set of electrode prongs are supported in the insert and electrically connected to the insert.

5. The prechamber sparkplug of claim 4 wherein the insert is annular and extends circumferentially around the nozzle axis and forms an electrode opening for the first set of electrode prongs.

6. The prechamber sparkplug of claim 5 wherein the insert is formed of an insert material, and the second set of electrode prongs are formed of an electrode material different from the insert material.

7. The prechamber sparkplug of claim 4 wherein the insert has an insert axial thickness, and each one of the second set of electrode prongs has a full electrode axial length that is from 2 times to 4 times the insert axial thickness.

8. A nozzle subassembly for a prechamber sparkplug comprising:
   a nozzle body having an outer surface, and an inner surface forming a prechamber having a prechamber wall extending circumferentially around a nozzle axis;
   the nozzle axis extending between an upper nozzle end, and a lower nozzle end forming at least one gas port extending from the inner surface to the outer surface and oriented at a swirl angle relative to the nozzle axis;
   a first set of electrode prongs including electrode tips within the prechamber;
   a second set of electrode prongs each extending, in a path parallel to the nozzle axis, from a base end attached to the nozzle body to an electrode tip within the prechamber;
   the second set of electrode prongs are aligned with the first set of electrode prongs to form anode-cathode pairs defining spark gaps; and
   each of the anode-cathode pairs is spaced radially inward from the prechamber wall, such that a clearance extends between each anode-cathode pair and the prechamber wall and the spark gaps are positioned for impingement by a flow of swirled gases from the at least one gas port.

9. The nozzle subassembly of claim 8 wherein each of the first set of electrode prongs extends in a curvilinear path from a base end to the respective electrode tip, and each of the second set of electrode prongs extends in a linear path from the respective base end to the respective electrode tip.

10. The nozzle subassembly of claim 8 wherein each one of the second set of electrode prongs has an exposed electrode length, within the prechamber, greater than a size of the clearance.

11. The nozzle subassembly of claim 8 wherein the second set of electrode prongs each have a heat transference length with the housing, and full electrode axial length that is from 2 times to 4 times the heat transference length.

12. The nozzle subassembly of claim 8 wherein the first set of electrode prongs are located radially inward of the second set of electrode prongs and supported in an insulator coupled to the nozzle body.

13. The nozzle subassembly of claim 12 wherein the nozzle body includes an insert and the second set of electrode prongs are supported in the insert.

14. The nozzle subassembly of claim 13 wherein the insert includes an inner diameter surface forming an electrode opening for the first set of electrode prongs, and the second set of electrode prongs are attached to the inner diameter surface and spaced circumferentially around the electrode opening.

15. The nozzle subassembly of claim 8 wherein the nozzle body is formed of a nozzle body material and each of the first set of electrode prongs is formed of an electrode material different from the nozzle body material.

\* \* \* \* \*